United States Patent [19]
Strub

[11] 3,756,673
[45] Sept. 4, 1973

[54] STUFFING BOX FOR A ROTATING SHAFT
[75] Inventor: Rene Strub, Winterthur, Switzerland
[73] Assignee: Brown-Boveri Sulzer Turbomachinery, Ltd., Zurich, Switzerland
[22] Filed: June 30, 1972
[21] Appl. No.: 268,162

[30] Foreign Application Priority Data
July 9, 1971 Switzerland.................. 10098/71

[52] U.S. Cl.................. 308/36.3, 277/27, 277/75
[51] Int. Cl. .... F16j 15/28, F16j 15/40, F16c 33/72
[58] Field of Search.................. 308/36.1, 36.3; 277/74, 75, 27, 133

[56] References Cited
UNITED STATES PATENTS
2,956,825  11/1960  Hore et al.................. 277/27
3,617,068  11/1971  Sprenger.................. 277/75

Primary Examiner—Samuel B. Rothberg
Assistant Examiner—Robert I. Smith
Attorney—Hugh A. Charin and Francis C. Hand

[57] ABSTRACT

The stuffing box is provided with one or more bush seals in which at least one seal gap is formed about the shaft to provide a sealing means along with a bearing gap of wedge-shape to provide a hydrodynamic bearing. In addition, resilient elements are spaced about the circumferential periphery of the bush containing the bearing gap between the bush and casing to transmit forces from the shaft via the lubricating film to the casing.

5 Claims, 5 Drawing Figures

STUFFING BOX FOR A ROTATING SHAFT

This invention relates to a stuffing box for a rotating shaft.

Heretofore, stuffing boxes for rotating shafts have been known, for example, as in German Auslegeschrift 1,090,751, wherein one or more bush seals have been provided with a gap in a first section in order to form a seal gap in conjunction with the shaft for a barrier fluid flow.

However, it has been a problem in these stuffing box constructions to center the bush seal relative to the shaft sufficiently well to ensure that the thin barrier film cannot be destroyed at any position in the presence of relative motions between the shaft and the bush. This is important since destruction of the film would result in metallic contact and therefore destruction of the journal surfaces between the shaft and the bush seal. In order to overcome this problem, it has been known to provide a stuffing box with a section for forming hydrodynamic load-bearing films within the bush seal in addition to the seal gap. While such load-bearing films may center the bush seal to a certain extent so that the positions which are to be sealed are protected against relative metallic contact, the bearings used to support the shaft have been arranged outside the bush seal at a distance appropriate to the design conditions. As a result, relative motions can occur between the stuffing box centered on the shaft and the machine casing, particularly in the presence of transversal oscillations of the shaft or of the casing which can represent a hazard for the bush seal. Further, even if the means for supporting the shaft and therefore its weight were moved as close as possible to the bush seal, satisfactory reliability would still not be possible.

Accordingly, it is an object of the invention to provide a stuffing box which assures the integrity of a barrier film between a shaft and a bush seal.

It is another object of the invention to minimize the forces resulting from oscillations between a shaft and casing within a stuffing box.

It is another object of the invention to maintain a rotating shaft centered within a bush seal of a stuffing box.

Briefly, the invention provides a stuffing box for a rotating shaft which includes a casing, at least one bush seal mounted within the casing and an annular resiliently acting element between the casing and the shaft for radially supporting the shaft in the casing. The bush seal includes a first section for defining a seal gap with the shaft for a barrier fluid film and a second section for defining a wedge-shape gap with the shaft in a circumferential direction of the shaft for a hydrodynamic load bearing film. Also, the resiliently-acting element is located between the bush seal and the casing so that forces can be transmitted from the shaft via the load bearing film and bush seal to the casing.

The resilient transmission of forces between the shaft and the casing enables forces resulting from oscillations to be minimized and to be transmitted so smoothly that damage of the seal surfaces need no longer be feared. The resilient support provided by the resiliently-acting element provides the bush with sufficient freedom to remain centered relative to the shaft despite disturbing forces so that the appearance of dry places and destruction in the seal gap are practically excluded. There is also a significant reduction in the cost of construction.

The stuffing box according to the invention is particularly suited for turbo machines through which gaseous working media flow, for example, turbocompressors and turbines of nuclear power stations.

In one embodiment, two serially disposed bushes can be used in the stuffing box. In this case, the section for forming the hydrodynamic load-bearing film is appropriately disposed in the bush seal on the low-pressure side of the stuffing box.

The resiliently-acting element which acts as a means for supporting the bush seal in the casing can be made from a packing disposed between the casing and the bush seal and comprises concentrically stacked shells which slightly deviate from the cylindrical shape and therefore act resiliently. In order to form the wedge-shaped hydrodynamic load-bearing films, the load-bearing section of the bush seal may be provided with at least three pocket indentations which are axially orientated. As seen in the direction of rotation of the shaft, these indentations adjoint the wedge-shaped load-bearing gaps to deliver a fluid medium thereto. Further, a substantial part of each load bearing gap is wider than the barrier gap.

In another embodiment, the supporting section of the shaft is provided with rockable bearing segmens. In this embodiment, a substantial part of the wedge-shaped load-bearing gaps which are produced between the shaft and the bearing segments are wider than the barrier gap.

These and other objects and advantages of the invention will become more apparent from the following detailed description and appended claims taken in conjunction with the accompanying drawings in which:

Figure 1:
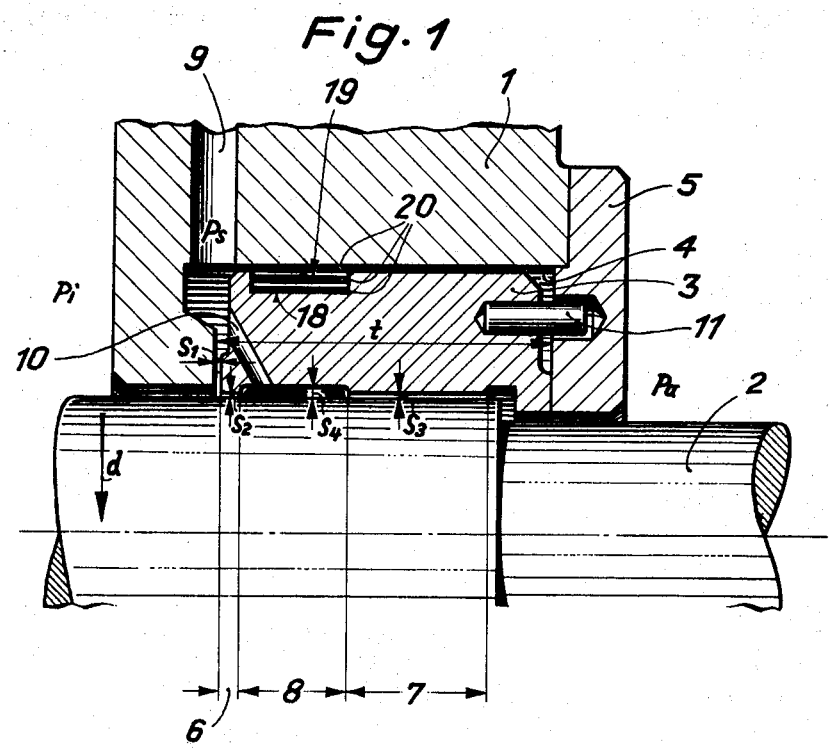
FIG. 1 illustrates a partly cross-sectional longitudinal view of a stuffing box with a simple radial bearing according to the invention.

Referring to FIG. 1, a machine casing 1 is provided with a stuffing box for a rotatable shaft 2 to effect a seal against a pressure difference between an internal pressure Pi within the casing 1 and an external pressure Pa on the opposite side of the casing 1. To this end, the stuffing box includes a bush seal 3 which surrounds the shaft 2 and is located in a stuffing box chamber 4. The chamber 4 is closed by a cover 5 so as to produce a distance $t$ between the floor of the chamber 4 and the cover surface. The length of the bush seal 3 is selected so that sufficient axial clearance S1 for the radial motion of the bush seal 3 remains even in the presence of the largest temperature differences which may occur between the casing 1 and the bush seal 3. A pin 11 is also secured in the bush seal 3 and located in an enlarged recess in the casing 1 in order to prevent the bush seal 3 from corotating with the shaft while leaving clearance for radial adjustment.

The inner circumference of the bush seal 3 has three sections 6, 7 and 8. Of these sections, the two endmost sections 6 and 7 are sized relative to the shaft to effect seal gaps S2, S3 relative to the high-pressure and low-pressure sides while the intermediate section 8 is sized relative to the shaft to form bearing gaps S4 to guide the bush seal 3 radially relative to the shaft 2. As shown, the seal gaps S2, S3 are narrower than the bearing gap S4 of the load bearing section 8. In addition, the bearing gap S4 is of a wedge shape as viewed in the circumferential direction of the shaft 2. Thus, hydrodynamic antifriction films of wedge-shaped form may be produced in the section 8 by the afore-described dimensioning, which films are able to maintain the bush seal 3 strictly centrally relative to the shaft 2 in order to avoid metallic contact in the sealing sections 6 and 7.

In order to introduce barrier medium into the stuffing box, a bore 9 is provided in the casing 1 to conduct the barrier medium from a suitable source (not shown) into the chamber 4 under a pressure Ps. A bore 10 is also provided in the bush seal 3 to conduct the barrier medium from the chamber 4 into the section 8 so as to form wedge-shaped hydrodynamic anti-friction films in the wedge-shaped gaps S4. These films serve to retain the bush seal 3 radially centrally on the shaft 2 during rotation of the shaft 2 in the casing 1.

As shown in FIG. 1, the outside of the bush seal 3 is provided with a slot 18 into which a resilient element 19 is inserted. This element 19 comprises individual shells 20 stacked in three layers, as more particularly shown in FIG. 3, to form a cylindrical element which surrounds the shaft. The coaxially and superjacently stacked shells 20 have a shape which deviates slightly from the cylindrical shape so that their resilient action in the transmission of radial forces from the shaft 2 through the lubricating film on to the casing 1 permits limited corresponding resilient changes of shape.

The pressure Ps of the barrier medium supplied to the system is higher by a small amount than the pressur Pi in the machine casing 1 so that the ingress of gases into the stuffing box is prevented by the barrier flow in the gaps S1 and S2. The section 7 seals the barrier medium relative to the exterior e.g. another chamber. A pressure gradient extending from the barrier medium pressure Ps to the external pressure Pa is therefore created over the length of the section 7. Quantities of barrier medium which pass into the machine casing 1 and on the other hand to the exterior under these conditions of barrier medium flow must be collected and discharged by means which are not shown.

Figure 2:
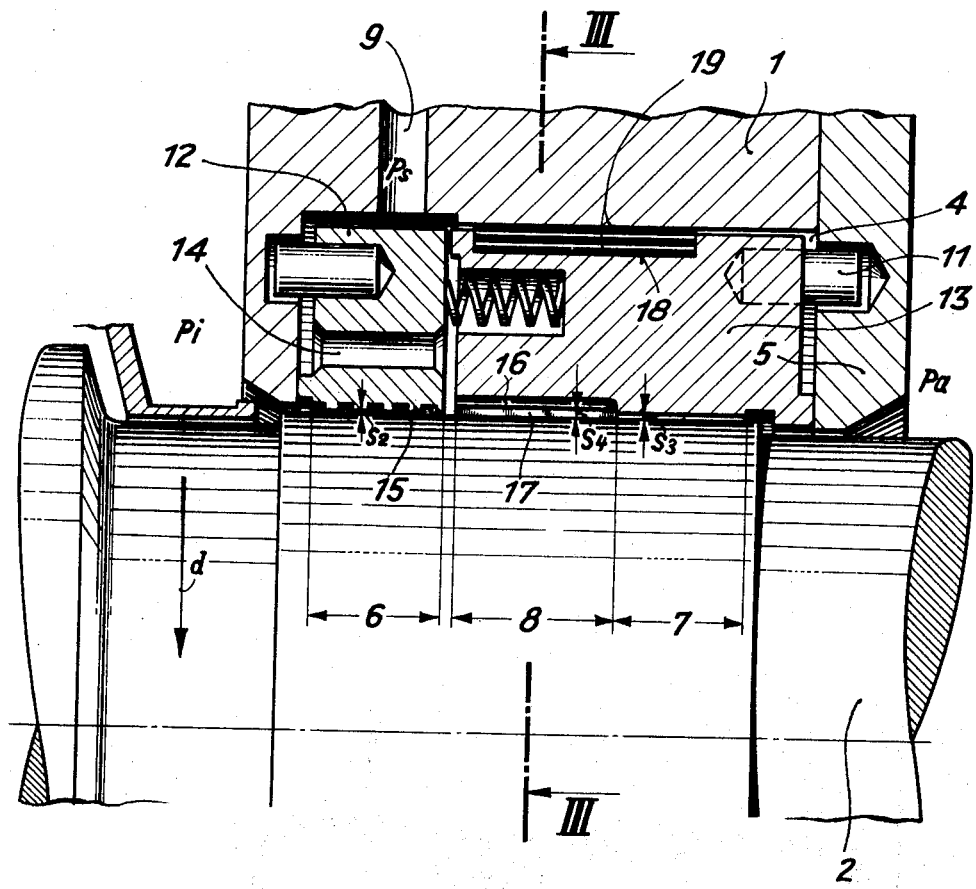
FIG. 2 illustrates a view taken on line II—II of FIG. 3 of a modified stuffing box according to the invention with two bush seals.
Figure 3:
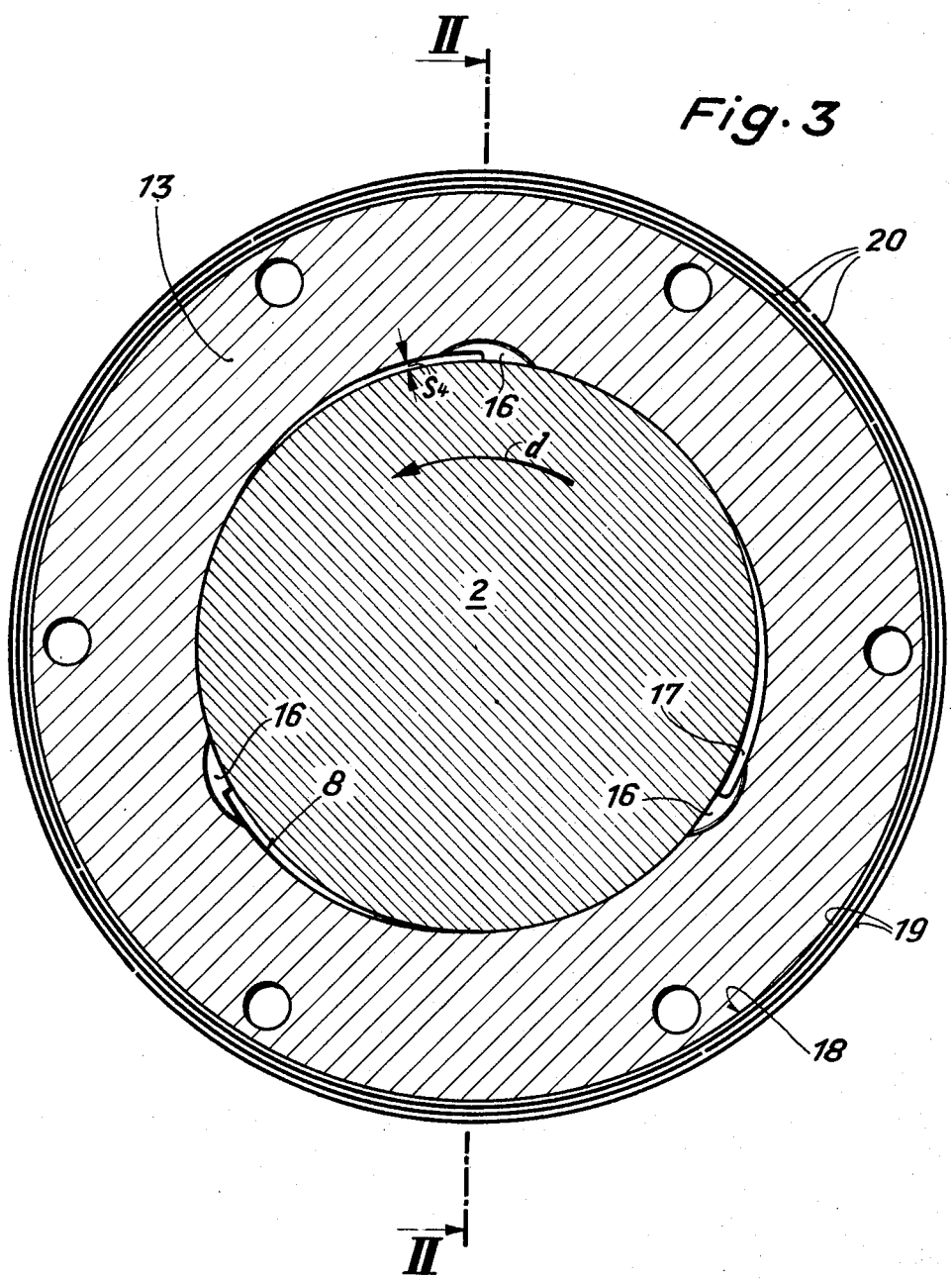
FIG. 3 illustrates a view taken on line III—III of FIG. 2.

Referring to FIGS. 2 and 3, wherein like reference characters indicate like parts as above, the stuffing box can be constructed with two bush seals. One bush seal 12 is constructed for the high pressure side of the stuffing box while the other bush seal 13 is constructed for the low pressure side. The overall length of both bushes 12 and 13 is smaller than the distance between the floor of the stuffing box chamber 4 and the cover 5 so that the bushes remain radially freely movable even in the presence of the greatest temperature differences. The barrier medium is supplied through a bore 9 into the stuffing box chamber 4 and from there through bores 14 in the bush seal 12 into a gap between the two bush seals 12, 13. From here a barrier flow passes through the seal gap between the bush seal 12 and the shaft 2 relative to the high-pressure side and on the other hand through the seal gap between the bush seal 13 and the shaft 2 relative to the low-pressure side.

The bush seal 12 on the high-pressure side has a clearance S2 relative to the shaft 2 and is provided on the internal surface with screwthreading 15 which tends to thrust back barrier medium ingressing from the chamber 4 into the seal gap when the operating direction is that indicated by the arrow $d$ in order to minimize the amount of barrier medium which enters inside the machine casing 1.

The bush seal 13 on the low pressure side is provided with two sections 7 and 8 of which one is provided for sealing the barrier medium relative to the low-pressure side and the second is provided for guiding the bush seal 13 radially on the shaft 2. The gap S4 between the bush and the shaft in section 8 is wider than the gap S3 between the section 7 and the shaft 2. As indicated in FIG. 3, the section 8 is provided with three axially oriented pockets 16 through which the barrier medium may be supplied from the gap between the bush seals 12, 13 to form a load-bearing film in the section 8 and to form a seal film in the section 7. As seen in the direction of rotation and adjoining the pockets 16, the bush seal 13 have wedge-shaped recesses 17 in the section 8 beginning with a gap depth S4 and constricting to the next pocket. The gap depth S4, at least in a substantial portion of each wedge, is greater than the gap depth S2 and S3 of the sections 6 and 7 intended for the barrier flow. Load-bearing films, which initially center the bush seal 13 relative to the shaft 2 and moreover are able to transmit radial forces from the shaft 2 to the bush seal 13 without distributing the centering action, are produced in the recesses 17. The exterior of the bush seal 13 has a slot 18 into which a resilient element 19 as above is inserted to transmit radial forces from the shaft 2 via the lubricating film to the casing 1.

Figure 4:
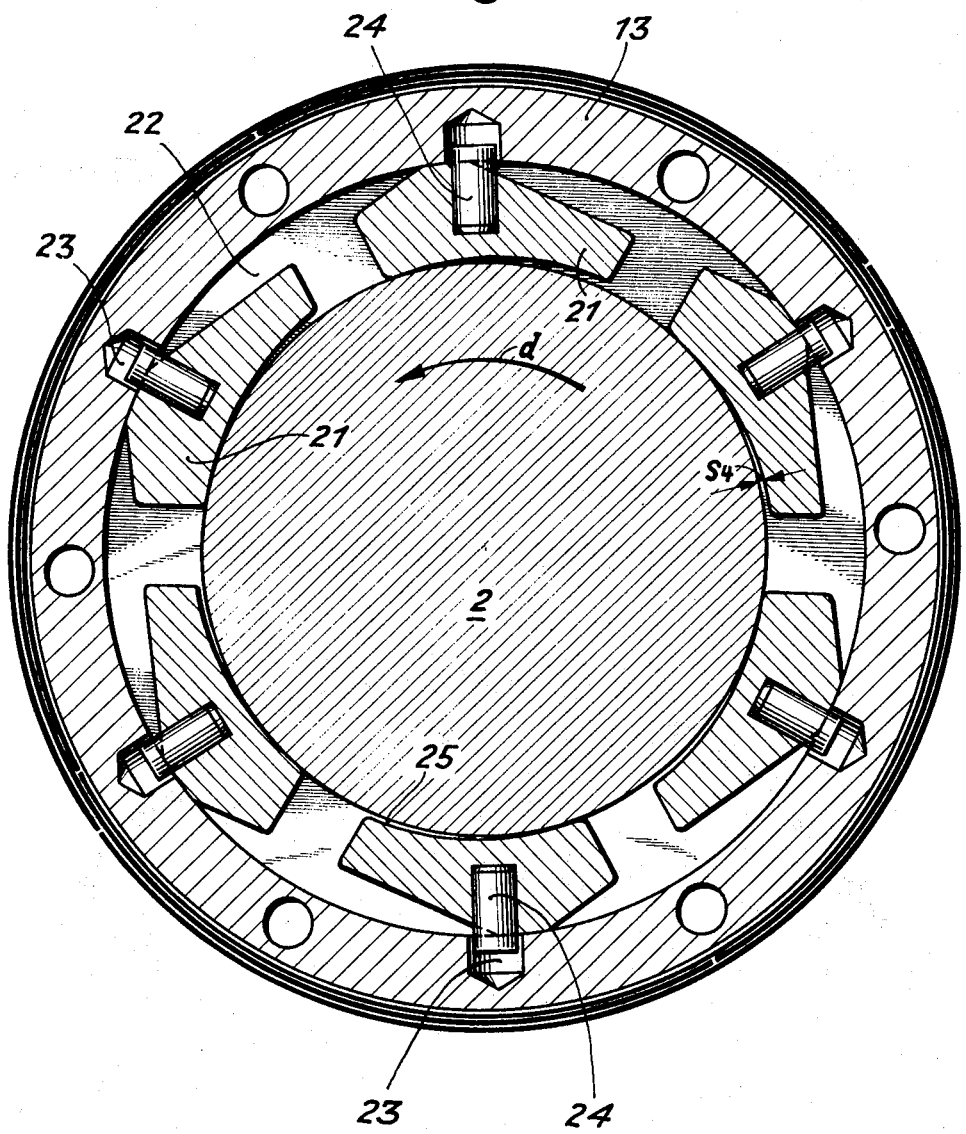
FIG. 4 illustrates a transverse cross-sectional view of a bush seal provided with rockable bearing segments according to the invention.

Referring to FIG. 4, it is also possible to employ rockable bearing segments 21 instead of lubricating pockets 16 and recesses 17 for the purpose of supporting the shaft 2. To this end, the bush seal 13 is provided with a circumferential slot 22 sized to accommodate the bearing segments 21. Also, pins 24 are inserted in the bearing segments 21 and placed in enlarged bores 23 in the bush seal 13 to prevent the bearing segments from rotating with the shaft 2. The bearing segments 21 may then incline so that the bearing film wedges 25 which are formed by a barrier medium adjust themselves to the shape which is an optimum for the bearing system.

Figure 5:
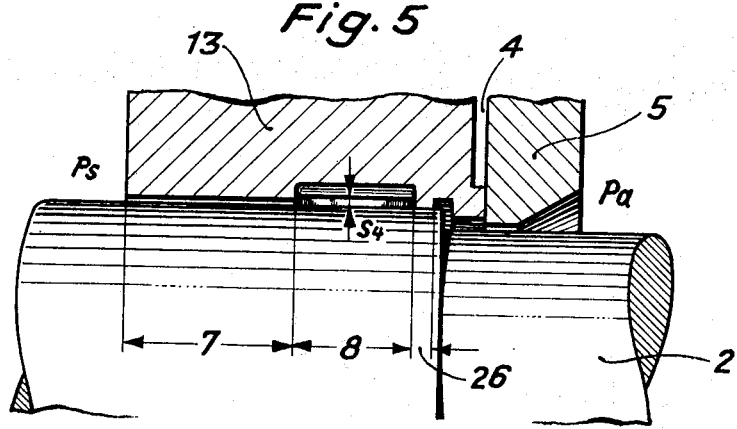
FIG. 5 illustrates a cross-sectional view of a bush seal with a sealing section disposed on a high-pressure side of a stuffing box and a load-bearing section disposed on a low-pressure side in accordance with the invention.

Finally, referring to FIG. 5 wherein like reference characters indicate like parts as above, the section 8 used for centering the bush seal 13 need not be disposed between the seal sections 7 and 6 as in FIG. 2. Instead, the load bearing section 8 is displaced towards the low-pressure side outside the seal section 7. However, this requires an additional seal section 26 which restricts to the permissible extent any discharge of the sealing medium which acts as a load-bearing film from the section 8 to the outside of the machine casing.

What is claimed is:
1. A stuffing box for a rotating shaft comprising
    a casing;
    at least one bush seal mounted within said casing,
        said bush seal having a first section for defining a seal gap with the shaft for a barrier fluid flow and a second section for defining a wedge-shaped gap with the shaft in a circumferential direction of the shaft for a hydrodynamic load bearing film; and an annular resiliently-acting element between said casing and the shaft for radially supporting the shaft in said casing.

2. A stuffing box as set forth in claim 1 having two serially aligned bush seals in said casing defining a chamber for a barrier fluid therebetween wherein one of said bush seals contains said seal gap and said wedge-shaped gap therein and wherein said seal gap is radially narrower than a substantial portion of said wedge-shaped gap.

3. A stuffing box as set forth in claim 1 wherein said annular resiliently shaped element includes a packing of concentrically and superjacently stacked shells betweeen said casing and said bush seal, each said shell deviating slightly from a cylindrical shape.

4. A stuffing box as set forth in claim 1 wherein said bush seal includes at least said wedge-shaped gaps and at least two pocket-shaped axially oriented indentations each communicating with a respective wedge-shaped gap to deliver fluid thereto.

5. A stuffing box as set forth in claim 1 wherein said bushing seal includes a plurality of rockable bearing segments in said second section, each said support being positioned to define a wedge-shaped gap with the shaft for a hydrodynamic load bearing film.

* * * * *